Aug. 8, 1961　　　M. B. MENTLEY ET AL　　　2,994,988
GEAR GRINDER GUIDING AND INCREMENTAL FEEDING MEANS
Filed July 7, 1958　　　　　　　　　　　　　　　4 Sheets-Sheet 1
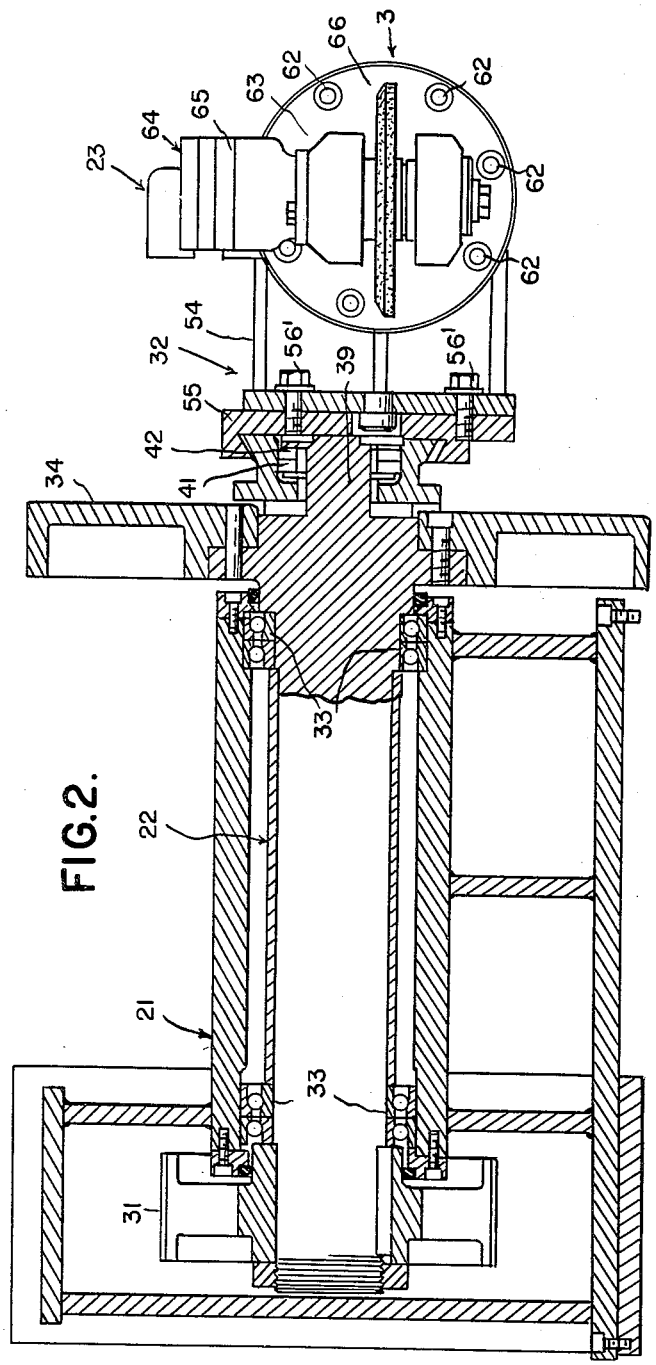
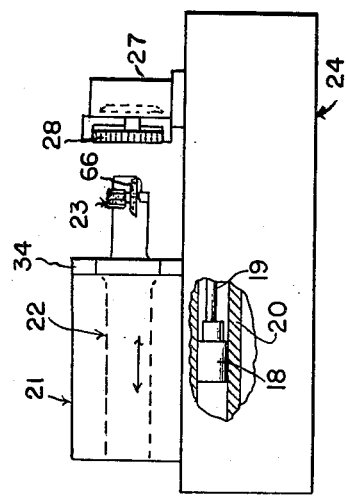
INVENTORS
MAX B. MENTLEY
DAVID W. DANIEL
BY
*Whittemore, Hulbert & Belknap*
ATTORNEYS

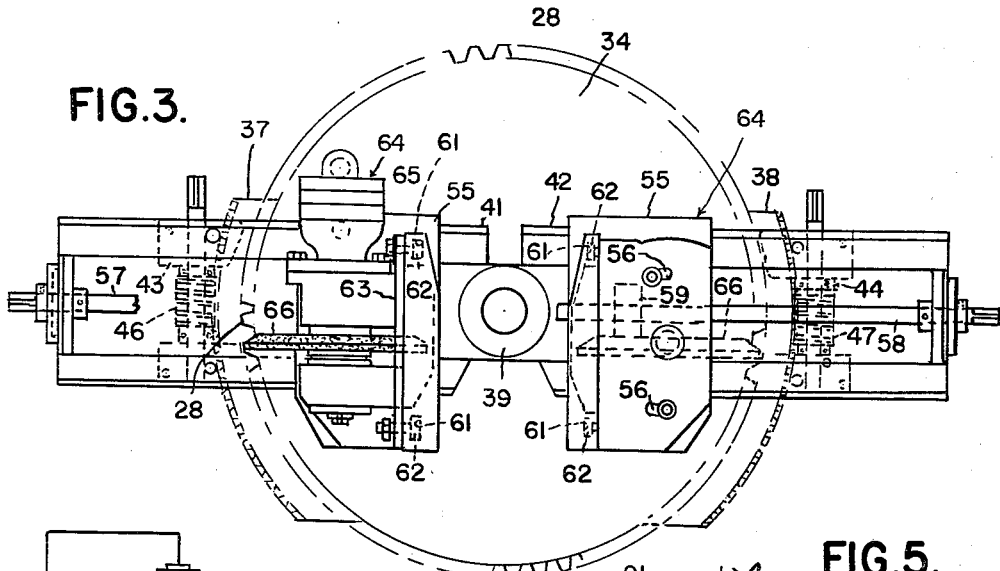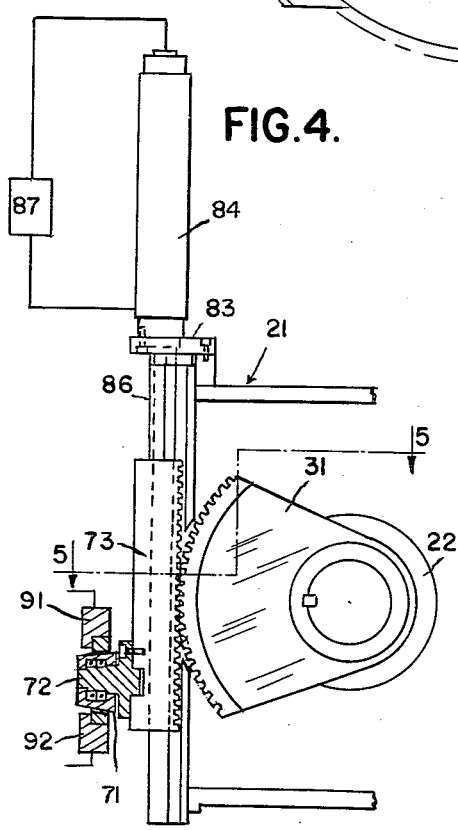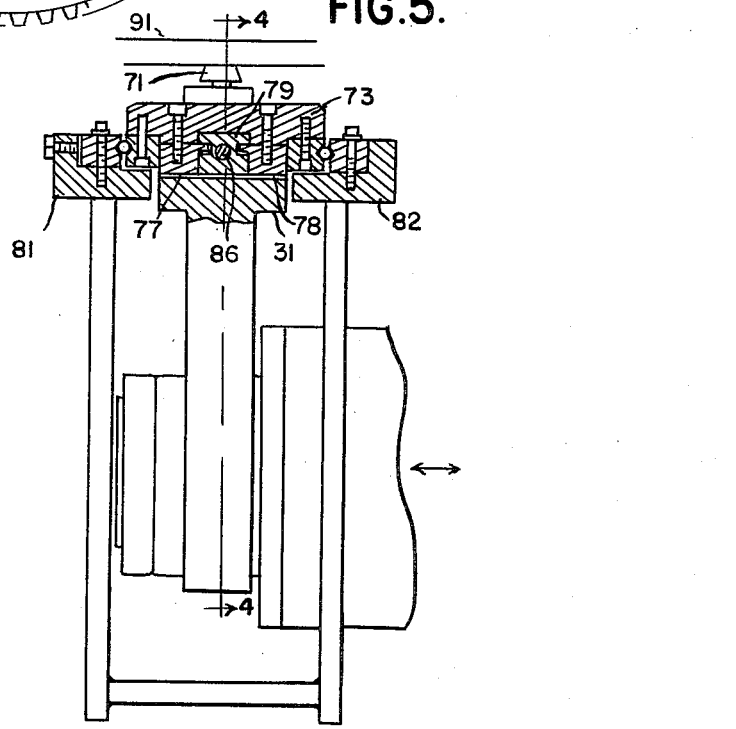

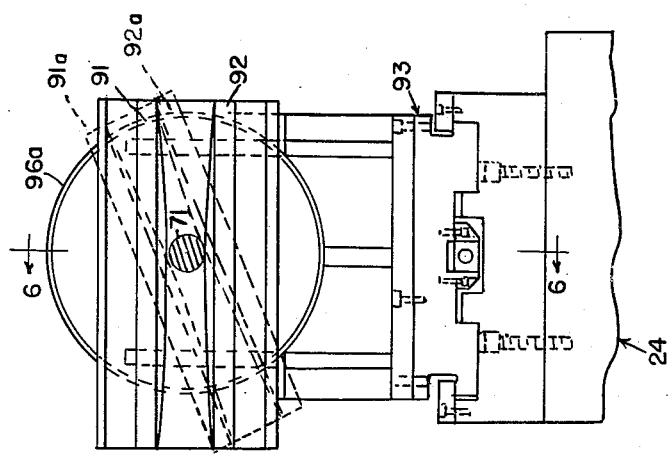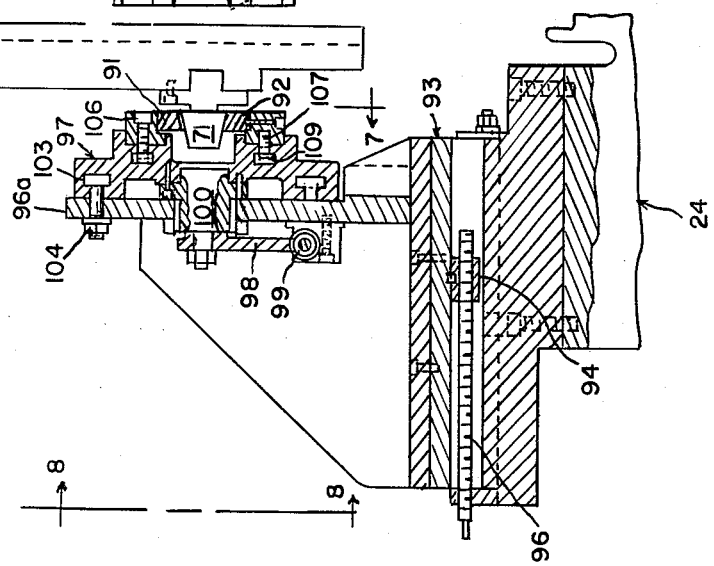

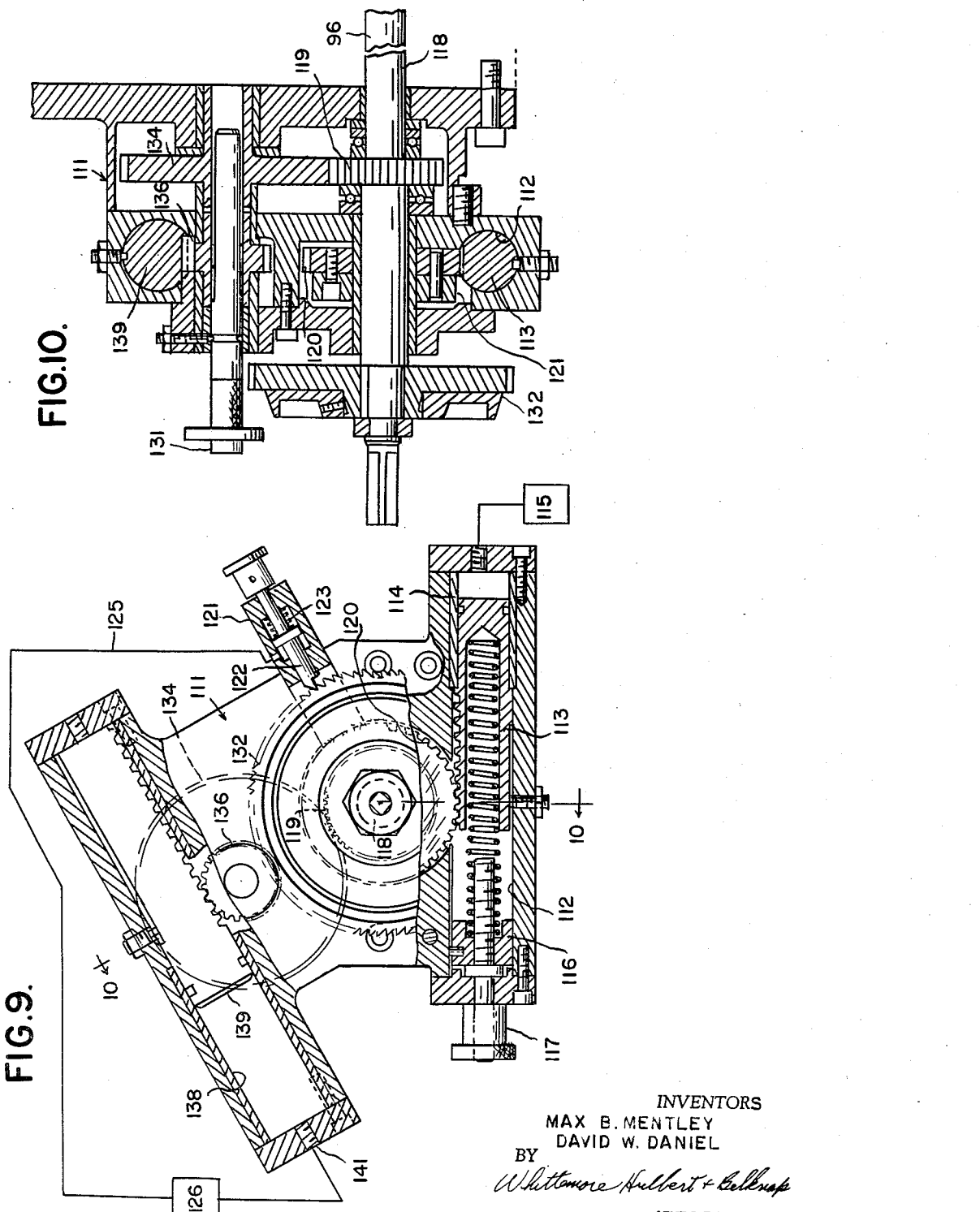

United States Patent Office 2,994,988
Patented Aug. 8, 1961

2,994,988
GEAR GRINDER GUIDING AND INCREMENTAL FEEDING MEANS
Max B. Mentley and David W. Daniel, Detroit, Mich., assignors to National Broach & Machine Company, Detroit, Mich., a corporation of Michigan
Filed July 7, 1958, Ser. No. 747,050
20 Claims. (Cl. 51—32)

This invention pertains to a guiding and incremental feeding means for a gear grinder which is particularly useful in forming and crowning helical or spur gears.

The preferred embodiment has a carriage reciprocably mounted to a machine base which carries two grinding wheels rotatably mounted on spaced axes with one grinding wheel working against one side of one tooth on the forward stroke and the other grinding wheel working against the opposite side of a second tooth on the reverse stroke. Means are provided whereby a single adjustment results in a feed increment of equal depth for both forward and reverse grinding cuts. Further means are provided which will automatically provide a series of incremental feed adjustments from an initial position and then return the feed depth to the initial position so that a gear tooth may have multiple grinding operations of successively increasing depths with the depth adjustment being automatically returned to an initial position. The gear may then be indexed so that a new tooth is placed in the path of the grinding wheels with this operation continuing until each tooth on the gear has been properly ground and with the entire operation being automatic.

To perform these functions this invention provides a carriage which is mounted for reciprocable longitudinal movement along a machine base with the carriage rotatably supporting a spindle which in turn carries a pair of spaced grinding wheels which are operable against opposite sides of an indexable internal gear with one wheel grinding one side and the other wheel grinding the other side of the gear teeth on forward and reverse strokes of the carriage, respectively. However, the spindle could carry the gear while the grinding wheels are connected to the base. Mounted to the base is a pair of parallel guiding or sine bars which are movable towards and away from the spindle and which are rotatable about an axis transverse to the spindle. These bars may have flat guiding surfaces or convex guiding surfaces for forming a crown on the gear teeth. Rotatably mounted to a gear rack, supported by the carriage for vertical movement is a conical follower which is engageable with and extendable between the sine bars. The gear rack in turn is engageable with a toothed sector which is fixed to one end of the rotatable spindle. The gear rack is piston urged upwardly on a longitudinal carriage movement in one direction and downwardly for opposite carriage movement so that the follower is urged into engagement first with one sine bar and then the other to impart rotary motion to the spindle corresponding to the inclination and configuration of the parallel guiding or sine bars. By moving the sine bars transversely towards and away from the carriage the clearance between the sine bars and the conical follower is correspondingly increased or decreased so that a variable depth of cut is effected. The greater the increase in clearance from a relative position between the bars and follower the greater the depth of cut on a succeeding stroke since there is greater rotative motion of the spindle. The increment of the depth of cut for both the forward and reverse strokes will be the same for the same transverse adjustment of the sine bars since equal clearances are established above and below the follower. If the sine bars are aligned parallel with the longitudinal movement of the carriage then the gear will be formed with spur teeth and if the bars are inclined to the direction of longitudinal travel the gear will be formed with helical teeth with the degree or angle of the helix depending on the angle of bar inclination.

In addition, this invention provides means for effecting the transverse movement of the sine bars in equal sequential increments and then automatically returning the sine bars to their initial position. This is accomplished by applying a pulse of pressurized fluid to a piston-rack combination which rotates a pawl which in turn drives a gear which advances the sine bars in a transverse direction in an amount dependent upon the stroke of the piston which is adjustable. The piston is then spring urged to its starting position while the pawl ratchets about the gear drive. In addition, the gear drive is connected to a second piston-rack combination and moves it a predetermined amount for each driving impulse corresponding to the depth of cut. A return impulse releases the pawl and is applied to the second piston-rack combination returning it and the driving gear to an initial position so that each tooth may receive a sequence of successive grinding cuts with the grinder being automatically returned to an initial position after the finishing cut.

An anti-backlash feature is provided to the cone follower rack by forming said rack into three vertical sections with the center section being slidable relative the side sections. The center section is then vertically biased so that a firm, clearance free connection is provided between the rack teeth and the teeth of the gear sector with which it is engaged.

It is, therefore, an object of this invention to provide a guiding and feeding apparatus for a metal forming machine which has a forming action on both a forward and reverse carriage stroke and which has means for adjusting equally the depth of the feed for both of said strokes.

It is a further object to provide a combination of guide bars and a cone follower having contact along a surface transversely inclined to carriage movement so that transverse adjustment of the guide bars relative the follower will result in equal feed increments for both forward and reverse strokes.

It is an object to provide for automatically adjusting the feed depth in successive increments and then providing an automatic return of the feed adjustment to an initial position.

It is still a further object to provide a piston actuated pawl for driving the feed adjustment and a return piston with the pawl and the return piston being actuated after a predetermined number of feeding adjustments to permit return of the feeding unit to an initial position.

Another object is to provide an anti-backlash rack having a constantly biased center sector for providing a firm, clearance free gear connection.

These and other objects will become more apparent when a preferred embodiment of our invention is considered in detail in connection with drawings in which:

FIGURE 1 is a diagrammatic side elevation view of an embodiment of this invention;

FIGURE 2 is a section showing the carriage, spindle, and spindle attached grinding assemblies;

FIGURE 3 is a partial, broken away end elevation showing the grinding wheels and their adjustments;

FIGURE 4 is a partial end elevation showing the cone follower and the anti-backlash gear rack and its connection to the spindle gear sector;

FIGURE 5 is a section taken at 5—5 of FIGURE 4;

FIGURE 6 is a section taken at 6—6 of FIGURE 7 and shows the transversely adjustable sine bars and their relation to the cone follower;

FIGURE 7 is a section taken at 7—7 of FIGURE 6;

FIGURE 8 is a view taken from the direction of arrows 8 in FIGURE 6;

FIGURE 9 is a broken away view of the automatic feed and return unit; and

FIGURE 10 is a section taken at 10—10 of FIGURE 9.

In FIGURE 1 the general relation between the grinding wheels and the gear with its indexing mechanism is shown. Carriage 21 carries spindle 22 and grinding assemblies 23 and is reciprocably mounted on base 24 which is provided with power means, such as the piston 18 and cylinder 20, for longitudinally moving the carriage 21. The piston 18 is provided with a connecting rod 19 which is secured to a depending carriage lug (not shown). Also mounted on base 24 is a conventional gear indexing mechanism 27 which supports and indexes gear 28 so that gear teeth are successively positioned in the path of the grinding wheels.

FIGURES 2 and 3 show in more detail the mounting of spindle 22 in carriage 21 and the attachment of grinding assemblies 23 to spindle 22. The left or rear end of spindle 22 has fixed thereto gear sector 31 and fixed to the forward end is headstock 32 with intermediate spindle portions being journaled by bearings 33 in carriage 21. Headstock 32 comprises a plate 34 which is bolted to the spindle shank and which has attached at its lateral sectors curvilinear gear racks 37, 38 (FIGURE 3). Extending from the end of the spindle shank is pilot 39 about which are pivoted the ends of track arms 41, 42 which arms are provided intermediate their ends with bearings 43, 44 for transversely journaling respectively worm gears 46, 47 which are engaged with the teeth on sectors 37, 38. Rotation of worm gears 46, 47 will respectively move arms 41, 42 about pilot 39. Each arm 41, 42 slidably supports an assembly track 55 which has bolted thereto an extension arm 54 which has slots 56 formed therein to permit rotative movement of arm 54 relative track 55 when bolts 56' are loosened. A circular T-slot 61 is formed in each arm 54 for containing adjustment bolts 62 for connecting a motor plate 63 which carries a grinding wheel assembly 64 which has a motor 65 for turning a grinding wheel 66 about its axis. Movement of each assembly 64 along its respective arm is provided by rotation of threaded shafts 57, 58 which are journaled respectively in arms 41, 42 and which are threadedly engaged in blocks 59, one of which is mounted to each track 55. It is seen, therefore that grinding wheels 66 are adjustable along a line parallel to a gear diameter by turning shafts 57 and 58 in order to accommodate this gear diameter. Wheels 66 are positioned below center of the gear 28 and operate against opposite sides of gear teeth. Grinding wheels 66 are also adjustable in the plane of the gear so that the angle of the tooth may be varied and this adjustment results from moving slots 56 about bolts 56'. The wheels are further adjustable by loosening bolts 62 and rotating the motor mounts in T-slots 61.

In FIGURES 4 and 5 the connection between the conical follower and the means for rotating the spindle is shown. Follower 71 is a truncated cone rotatably mounted about pivot 72 which is bolted to follower plate 73. A gear rack is formed in three vertical sections with the two side sections 77, 78 being bolted to plate 73 and a center section 79 being slidable between side sections 77, 78. Plate 73 slides vertically between posts 81, 82 of carriage 21, which support at their upper ends horizontal member 83 which in turn supports cylinder 84. Slidably mounted in cylinder 84 is piston rod 86 which is attached to center rack portion 79. On a forward movement of carriage 21, device 87, which may be actuated by limit switches in the path of carriage 21, delivers fluid pressure to one end of cylinder 84 and on the reverse movement of carriage 21, delivers pressure to the other cylinder end. Fixed to the end of spindle 22 is gear sector 31 which has helical teeth engageable with the rack portions 77, 78 and 79. Due to the vertical biasing of rack portion 79 by piston rod 86, any clearance between the rack teeth and gear teeth is automatically adjusted for. As the plate 73 moves vertically, the gear sector 31 and spindle 22 are rotated about the spindle axes.

Guiding or sine bars 91, 92 and their adjustable mounting to base 24 are shown in FIGURES 6 to 8. Guide bar plate 93 carries threaded block 94 which is engaged with threaded shaft 96, journaled for rotative movement in base 24. Operation of shaft 96 will move guide bar plate 93 in a direction transverse to the movement of carriage 21. Vertically supported to base plate 93 is guide support 96a which rotatably supports guide bar housing 97. Attached to housing 97 is gear sector 98 which is engaged with worm gear 99 which is rotatably supported to the rear of support 96a. Crank stub 101 is fixed to gear 99 and rotation thereof will rotate housing 97. Formed in the outer circumference of housing 97 is circular T-slot 103 which contains bolts 104 which lock the housing in the adjusted position. Guide bars 91, 92 are connected respectively to housing 97 by means of bolts 106, 107 which ride in T-slots 109 of housing 97. Rotation of housing 97 about pivot 100 will result in an inclination of guide bars 91, 92 which in turn will cause a corresponding vertical movement of follower 71 and resulting rotation of spindle 22 during longitudinal movement of spindle 22 thereby affecting the helix angle ground on the gear teeth. Transverse movement of the guide bars 91, 92, caused by turning shaft 96, will increase or decrease the clearance between follower 71 and the guide bars so that the rotative motion of the spindle will be changed accordingly; the greater the clearance, the more motion and the greater the depth of cut. Furthermore, since transverse movement of the guide bars 91, 92 results in equal spacing above and below the conical follower, equal changes in depth of cut will be effected on both the forward and reverse cutting strokes with one grinding wheel 66 cutting on a forward stroke and the other wheel 66 cutting on a reverse stroke. In addition, by forming the bars with convexities as shown in FIGURE 7, the rotative position of the spindle as it moves in its longitudinal path will be altered in order to place a corresponding crown on the gear teeth. It is to be noted that the shape of the crown or other configuration to be formed on the gear teeth can be changed by simply inserting a sine bar having the proper surface configuration. Sine bars 91, 92 may be individually replaced so that a gear may be ground having the configuration on one side of the tooth different from that on the other. The bars are shown in alternate postions 91a, 92a as they would be for helix grinding.

On reciprocating carriage 21 along base 24, follower 71 is urged by piston rod 86 against one sine bar, rotating spindle 22 in one direction and on a reverse stroke, rod 86 is reversed urging follower 71 against the other sine bar rotating the spindle in the other direction with one grinding wheel 66 cutting on the forward stroke and the other cutting on the return stroke. Transverse adjustment of the sine bars changes the depth of cut equally on both strokes and angular adjustment of the sine bars changes the helix angle.

Also provided in this invention is a means for automatically increasing the depth of cut and then returning the depth adjustment to an initial position. A device for accomplishing this, is shown in FIGURES 9 and 10 where is seen a housing 111 having a circular bore 112 which reciprocably supports a piston-rack combination 113. Piston 113 is shown spring urged to its rightwardmost position which is determined by the length of sleeve 114 inserted in bore 112. The right end of bore 112 communicates with fluid pressure source 115 which emits a pressure pulse for every reciprocation of carriage 21. Conventional sensing means, not shown, are used to actuate source 115 in the desired manner. Stop 116 is threadedly engaged with knob 117 and provides a variable leftward stop for piston 113.

Journaled in housing 111 is shaft 118 which has fixed thereto gear 119 and which rotatably supports gear 120 which is engaged with the rack on piston 113 and is rotated by longitudinal movement of piston 113.

Shaft 118 is connected to and rotates screw 96. Fixedly engaged with gear 120 is housing 121 which reciprocably supports pawl 122 which is urged radially inwardly by spring 123 acting against the pawl. A port is formed in the wall of housing 121 and communicates by passage 125 with a fluid pressure source 126. Inserted in housing 111 is manual override pin 131 which supports and rotates with gears 134 and 136. Also formed in housing 111 is bore 138 which reciprocably supports piston-rack 139 which is toothedly engaged with gear wheel 136. Formed at one end of cylinder 138 is passage 141 which also communicates with fluid pressure source 126 which is actuated by conventional counting or other means to send a pressure pulse to housing 121 and bore 138.

The operation of the automatic feed and return device shown in FIGURES 9 and 10 is as follows. A pulse of fluid pressure is received at the right end of piston 113 from fluid pressure source 115 which pulse may be generated when carriage 21 has completed a reciprocating stroke. Piston 113 will be moved leftwardly against its spring until it abuts stop 116 rotating gear 120 and its attached pawl 122 which turns shaft 118 and screw 96 in a feed adjustment direction and also turns gear 134 which advances gear 136 and piston 139 a corresponding amount. At the end of the pulse from pressure source 115, piston 113 will be spring urged rightwardly causing pawl 122 to ratchet against spring 123. Each turning of gear 136 advances piston 139 further in bore 138 and after a predetermined number of advances, a counter or other suitable mechanism actuates pressure source 126 which will send a pulse to passage 125 lifting pawl 122 free of gear 132 and at the same time send a pulse to the left end of cylinder 138 returning piston 139 to its initial position. This will also return shaft 118 through gears 136, 134 and 119 to its initial position thereby making any manual return unnecessary. This device may be operated in conjunction with the grinding machine so that for every indexed position of gear 28 a predetermined number of sequentially deeper grinding cuts may be taken on each tooth and then the sine bars will be returned to their initial position whence the gear 28 will be indexed to place a fresh pair of teeth in the path of the grinding wheels. The system may be returned or regulated manually by lifting pawl 122 and turning override pin 131.

The drawings and the foregoing specification constitute a description of the improved gear grinder guiding and incremental feeding means in such full, clear, concise and exact terms as to enable any person skilled in the art to practice the invention, the scope of which is indicated by the appended claims.

What we claim as our invention is:

1. Apparatus for grinding internal gears comprising a base, longitudinally movable rotatably mounted carrying means for carrying grinding wheel means towards a base mounted internal gear, guide means being mounted to said base, follower means connected to said carrying means and registrable with said guide means for imparting helical motion to said carrying means, said guide means contacting said follower means along a crown surface so that a corresponding variation is imparted to said rotatably mounted carrying means during its longitudinal movement, a fixed gear support, said carrying means carrying a pair of adjustable grinding wheels adapted to register against generally oppositely disposed teeth of an internal base supported gear.

2. Apparatus for grinding the teeth of internal gears comprising a base, rotatably mounted carrying means longitudinally movable relative said base for imparting a grinding operation to an internal gear, guide means being mounted to said base, follower means connected to said carrying means and registrable with said guide means, a wheel support, a pair of spaced grinding wheels on said wheel support adapted to register against opposite sides of the gear teeth with one wheel cutting on a forward stroke and the other wheel cutting on a reverse stroke.

3. Material forming mechanism comprising a base, rotatably mounted carrying means longitudinally movable relative said base, guide means being mounted to said base, follower means being connected to said carrying means and registrable with said guide means to rotate said carrying means during its longitudinal movement, a gear rack connected to said carrying means and in perpendicular alignment to the carrying means axis, said follower means being connected to said rack, a gear wheel being connected to said carrying means and registrable with said gear rack, said rack comprising a central and side portions with said central portion longitudinally movable relative the side portions, and fluid pressure biasing means for urging said central portion longitudinally to minimize gear backlash between said gear and said rack.

4. Material forming mechanism comprising a base, rotatably mounted carrying means longitudinally movable relative said base, guide means being mounted to said base, follower means being connected to said carrying means and registrable with said guide means to rotate said carrying means during its longitudinal movement, said guide means engageable with said follower means along a transversely inclined surface so that movement of said guide means towards and away from said follower means will effect the rotational movement of said carrying means correspondingly along its longitudinal path, said follower means comprising a rotatably mounted conical bearing so that movement towards and away from said guide means will decrease and increase the spacing with said guide means, means for urging said follower means against said guide means on longitudinal stroke of said carrying means.

5. A gear grinder comprising a base, a carriage slidable on said base, means for reciprocating said carriage, a rotary work support disposed with its axis parallel to the path of movement of said carriage, a rotary grinding wheel support having a formed grinding wheel thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars, means responsive to carriage travel to effect relative movement between said bars and follower parallel to said bars, means for effecting relative adjustment between said bars and follower parallel to the cone axis of said follower to adjust clearance of said follower relative to said bars, and means for biasing said one support alternately in opposite directions to shift said follower from engagement with one of said bars into engagement with the other.

6. A gear grinder comprising a base, a carriage slidable on said base, means for reciprocating said carriage, a rotary work support disposed with its axis parallel to the path of movement of said carriage, a rotary grinding wheel support having a formed grinding wheel thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars, means responsive to carriage travel to effect relative movement between said bars and follower parallel to said bars, means for effecting relative adjustment between said bars and follower parallel to the cone axis of said follower to adjust clearance of said follower relative to said bars, and means for biasing said one support in one direction during traverse of said carriage in one direction and in the opposite direction during traverse of said carriage in the opposite direction.

7. An automatic gear grinder comprising a base, a carriage slidable on said base, means for reciprocating said carriage, a rotary work support disposed with its axis parallel to the path of movement of said carriage, index mechanism operatively connected to said work support, a rotary grinding wheel support having a formed grinding wheel thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars, means responsive to carriage travel to effect relative movement between said bars and follower parallel to said bars, means responsive to completion of a transverse stroke of said carriage for effecting an increment of relative adjustment between said bars and follower parallel to the cone axis of said follower to adjust clearance of said follower relative to said bars, holding means for retaining the increment of adjustment, means for biasing said one support alternately in opposite directions to shift said follower from engagement with one of said bars into engagement with the other, means responsive to a predetermined number of strokes of said carriage to release said holding means and to restore said follower and bars to initial position, and means to index said work support to present a new tooth space to said wheel.

8. In a gear grinder a base, a carriage slidable longitudinally on said base, a rotary work support for supporting a work gear, a rotary wheel support having a formed grinding wheel carried thereby, means mounting one of said supports on said base, means mounting the other of said supports on said carriage, sine bar mechanism for effecting controlled rotation of one of said supports in accordance with traverse of said carriage comprising an elongated guide bar extending generally longitudinally of the path of movement of said carriage, said guide bar having a guide surface at one side thereof, a conical follower having a side engageable with the guide surface of said guide bar, said guide bar and follower being connected between said base and carriage for relative movement longitudinally of said guide bar in accordance with traverse of said carriage, means connecting said sine bar mechanism to one of said supports to effect angular movement thereof in accordance with traverse of said carriage, means operatively connected to said one support for biasing said follower and guide bar into engagement with each other, and adjustable means for effecting relative adjustment between said guide bar and follower in a direction parallel to the axis of said conical follower to thereby provide a depth feed between said grinding wheel and a work gear carried by said work support.

9. A gear grinder comprising a base, a carriage slidable on said base, means for reciprocating said carriage, a rotary work support disposed with its axis parallel to the path of movement of said carriage, a rotary grinding wheel support having a formed grinding wheel thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars for imparting rotary movement to the support to which said mechanism is connected on forward and reverse strokes of said carriage and means for effecting relative adjustment between said bars and said follower parallel to the cone axis of said follower to adjust clearance of said follower relative to said bars.

10. A gear grinder comprising a base, a carriage slidable on said base, means for reciprocating said carriage, a rotary work support disposed with its axis parallel to the path of movement of said carriage, a rotary grinding wheel support having a formed grinding wheel thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars, means responsive to carriage travel to effect relative movement between said bars and follower parallel to said bars, and means for effecting relative adjustment between said bars and follower parallel to the cone axis of said follower to adjust clearance of said follower relative to said bars.

11. A gear grinder comprising a base, a carriage slidable on said base, means for reciprocating said carriage, a rotary work support disposed with its axis parallel to the path of movement of said carriage for supporting a gear to be finished, a rotary grinding wheel support having a pair of formed grinding wheels spaced thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars, said wheel support adapted to register against opposite sides of the gear teeth with one grinding wheel cutting on a forward stroke and the other wheel on a reverse stroke of said carriage.

12. A gear grinder comprising a base, a carriage slidable on said base, means for reciprocating said carriage, a rotary work support disposed with its axis parallel to the path of movement of said carriage, a rotary grinding wheel support having a formed grinding wheel thereon, means mounting one of said supports on said base and the other of said supports on said carriage, and sine bar mechanism connected to one of said supports, said mechanism comprising a pair of laterally spaced parallel bars having opposed oppositely inclined surfaces and a conical follower extending into the space between said bars for effecting the rotational movement of the support to which the sine bar mechanism is connected correspondingly along its longitudinal path, said follower including a rotatably mounted conical bearing so that movement of said follower towards and away from said bars will decrease and increase the spacing with said bars respectively.

13. An automatic gear grinder comprising a base, a carriage slidable on said base, means for reciprocating said carriage, a rotary work support for supporting the gear to be finished, a rotary grinding wheel support having a formed grinding wheel thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars, first means responsive to completion of a traverse stroke of said carriage for effecting an increment of relative adjustment between said bars and follower parallel to the cone axis of said follower to adjust clearance of said follower relative to said bars, holding means for retaining the increment of adjustment, and second means responsive to a predetermined number of strokes of said carriage to release said holding means and to restore said follower and bars to initial position.

14. An automatic gear grinder comprising a base, a carriage slidable on said base, means for reciprocating said carriage, a rotary work support for supporting the gear to be finished, index mechanism operatively connected to said work support, a rotary grinding wheel support having a formed grinding wheel thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars, means responsive to carriage travel to effect relative movement between said bars and follower parallel to said bars, first means responsive to completion of a traverse stroke of said carriage for effecting an increment of relative adjustment between said bars and follower parallel to the cone axis of said follower to adjust clearance of said follower relative to said bars, holding means for retaining the increment of adjustment, second means responsive to a predetermined number of strokes of said carriage to release said holding means and to restore said follower and bars to initial position, and means to index said work support to present a new tooth space to said wheel.

15. An automatic gear grinder comprising a base, a carriage slidable on said base, means for reciprocating said carriage, a rotary work support for supporting the gear to be finished, a rotary grinding wheel support having a formed grinding wheel thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars, fluid actuating means including a cylinder and piston responsive to completion of a traverse stroke of said carriage for effecting an increment of relative adjustment between said bars and follower parallel to the cone axis of said follower to adjust clearance of said follower relative to said bars, pawl retaining means for holding the increment of adjustment, and second fluid actuating means including a cylinder and piston responsive to a predetermined number of strokes of said carriage to release said pawl retaining means and to restore said follower and bars to initial position.

16. A gear grinder comprising a base, a carriage slidable on said base, a feed shaft journaled for rotation in said base, means for reciprocating said carriage, a rotary work support disposed with its axis parallel to the path of movement of said carriage, a rotary grinding wheel support having a formed grinding wheel thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars, mounting means on said base for carrying said bars, means for connecting said feed shaft to said mounting means, and means for rotating said shaft so as to move said mounting means in a direction transverse to the movement of said carriage to effect an increment of relative adjustment between said bars and follower parallel to the cone axis of said follower to adjust clearance of said follower relative to said bars thereby providing a depth feed between said grinding wheel and a work gear carried by said work support.

17. An automatic gear grinder comprising a base, a carriage slidable on said base, a feed shaft journaled for rotation in said base, means for reciprocating said carriage, a rotary work support disposed with its axis parallel to the path of movement of said carriage, a rotary grinding wheel support having a formed grinding wheel thereon, means mounting one of said supports on said base and the other of said supports on said carriage, sine bar mechanism connected to one of said supports, said mechanism comprising a pair of laterally spaced parallel bars having opposed oppositely inclined surfaces and a conical follower extending into the space between said bars, mounting means on said base for carrying said bars, means for connecting said feed shaft to said mounting means and fluid actuating means responsive to completion of a traverse stroke of said carriage for rotating said shaft so as to move said mounting means in a direction transverse to the movement of said carriage and effect an increment of relative adjustment between said bars and follower parallel to the cone axis of said follower to adjust clearance of said follower to said bars thereby providing a depth feed between said grinding wheel and a work gear carried by said work support.

18. Automatic feed and return mechanism comprising a feed shaft, a return shaft, gear means on each of said shafts rotatable in mesh, a gear on each of said shafts, first and second fluid motors each including a cylinder and a piston having a rack thereon in mesh with one of said gears, means for directing fluid feed impulses to said first motor so as to move said piston and simultaneously adjustably rotate said feed shaft a predetermined increment for each impulse received and rotate said return shaft through said gear means a corresponding increment, holding means for retaining the increment of adjustment, and means for directing fluid to said second motor so as to move said second piston and simultaneously release said holding means and rotate said return shaft an amount sufficient to return said feed shaft to its original position.

19. A gear grinder comprising a base, a carriage slidable on said base, means for reciprocating said carriage, a rotary work support disposed with its axis parallel to the path of movement of said carriage, a rotary grinding wheel support having a formed grinding wheel thereon, means mounting one of said supports on said base and the other of said supports on said carriage, sine bar mechanism connected to one of said supports, said mechanism comprising a pair of parallel bars laterally spaced apart a fixed distance and having opposed oppositely inclined surfaces and a follower extending into the space between said bars, and means for effecting relative adjustment between said bars and follower in a direction which bisects the included angle between the inclined surfaces so as to adjust clearance of said follower relative to said bars.

20. A gear grinder comprising a base, a carriage slidable on said base, means for reciprocating said carriage, a rotary work support disposed with its axis parallel to the path of movement of said carriage, a rotary grinding wheel support having a formed grinding wheel thereon, means mounting one of said supports on said base and the other of said supports on said carriage, sine bar mechanism connected to one of said supports, said mechanism comprising a pair of parallel bars laterally spaced apart a fixed distance and having opposed oppositely inclined surfaces and a follower of varying circular cross section along the axis thereof, said follower extending into the space between said bars, and means for effecting relative adjustment between said bars and follower parallel to the axis of said follower to adjust clearance of said follower relative to said bars.

References Cited in the file of this patent

UNITED STATES PATENTS

| | | |
|---|---|---|
| 1,275,218 | Calkins | Aug. 13, 1918 |
| 1,870,764 | Aeppli | Aug. 9, 1932 |
| 2,066,220 | Orcutt | Dec. 29, 1936 |
| 2,245,462 | Christman | June 10, 1941 |
| 2,392,819 | Gruenberg et al. | Jan. 15, 1946 |
| 2,477,733 | Garside | Aug. 2, 1949 |

FOREIGN PATENTS

| | | |
|---|---|---|
| 755,962 | Great Britain | Aug. 29, 1956 |